United States Patent [19]
Scruggs et al.

[11] Patent Number: 5,482,580
[45] Date of Patent: Jan. 9, 1996

[54] JOINING OF METALS USING A BULK AMORPHOUS INTERMEDIATE LAYER

[75] Inventors: David M. Scruggs, Oceanside; William L. Johnson, Pasadena, both of Calif.; Jimmie B. Bolton, Conroe, Tex.; Atakan Peker, Pasadena, Calif.

[73] Assignee: Amorphous Alloys Corp., Laguna Niguel, Calif.

[21] Appl. No.: 258,766

[22] Filed: Jun. 13, 1994

[51] Int. Cl.⁶ .......................... B23K 35/22; B23K 103/16
[52] U.S. Cl. .......................... 148/528; 148/530; 148/561; 228/197; 228/233.2
[58] Field of Search .................... 148/528, 529, 148/530, 537, 561; 228/193, 197, 200, 233.2

[56] References Cited

FOREIGN PATENT DOCUMENTS 5-131279  5/1993  Japan ..................... 228/193
5-169282  7/1993  Japan ..................... 228/193

*Primary Examiner*—George Wyszomierski
*Attorney, Agent, or Firm*—Gregory Garmong

[57] ABSTRACT

Two pieces of metal are joined together using an amorphous metallic joining element. In the joining operation, the joining element is placed between the two pieces to be joined. The joining element and adjacent regions of the pieces being joined are given a joining processing sequence of heating to a joining temperature, forcing the two pieces together for a period of time, and cooling. The joining element has a composition that is amorphous after the processing is complete. The joining element composition is also selected such that, after interdiffusion of elements from the pieces being joined into the joining element during processing, the resulting composition is amorphous after cooling.

21 Claims, 5 Drawing Sheets

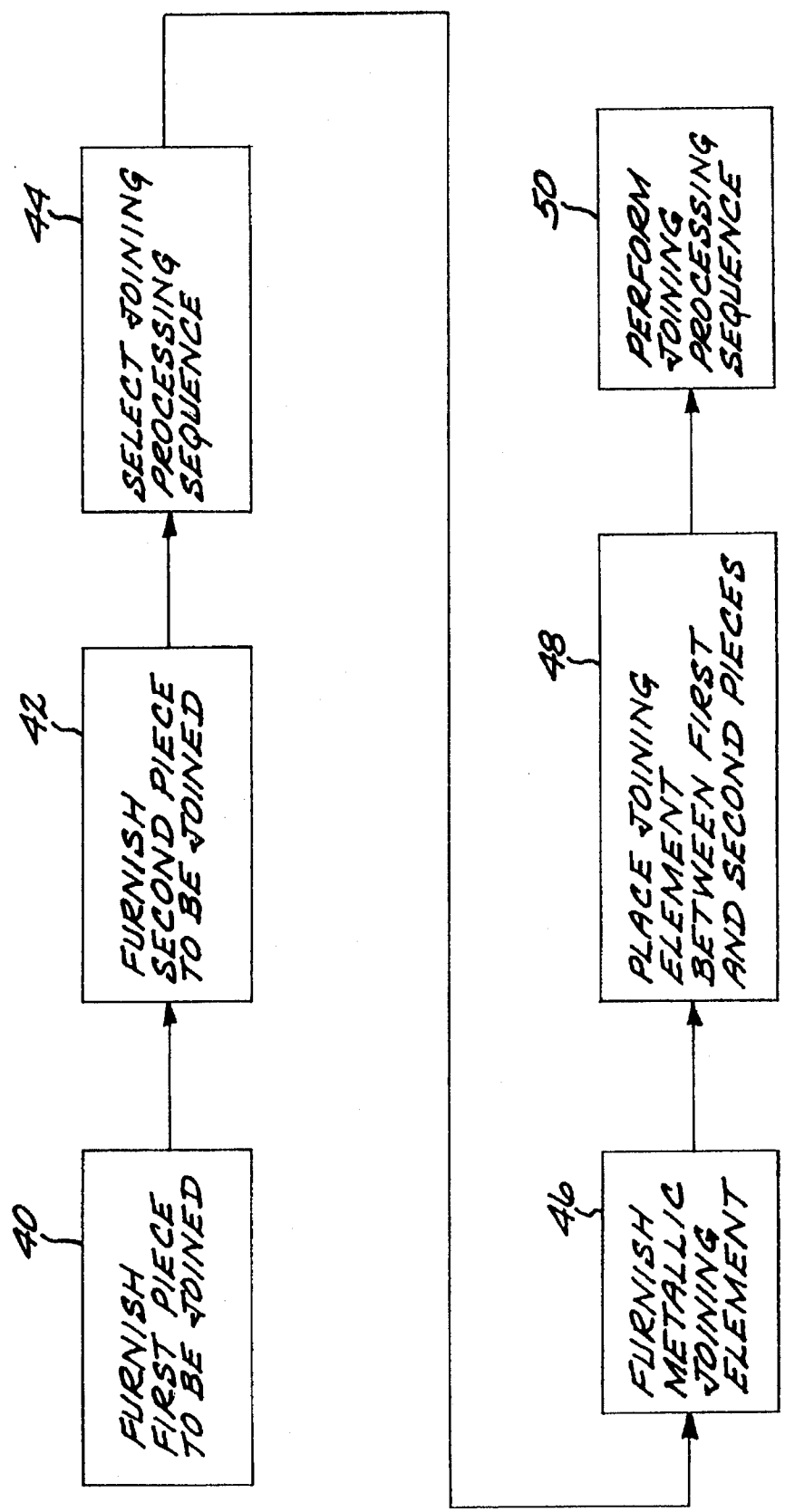

JOINING OF METALS USING A BULK AMORPHOUS INTERMEDIATE LAYER

BACKGROUND OF THE INVENTION

This invention relates to the joining of metals, and, more particularly, to the use of an amorphous intermediate bonding element to effect the joint.

Most of the applications of metals in structures require their joining to other metals in some fashion, and a large number of approaches are in use. Some joining techniques use fasteners such as bolts, rivets, screws, and the like. Other joining techniques use direct metal-to-metal bonds, bonds with an intermediate adhesive layer, or bonds with an intermediate metallic joining layer. The latter category includes the known techniques of welding, brazing, and soldering. The present invention relates to an improved joining technique using an intermediate metallic joining element placed between the pieces being joined.

Existing joining techniques of this general type have significant shortcomings when used in particular applications. In welding, the pieces being joined are typically locally melted in the region of the joint and fused with a filler metal. Depending upon the metals being welded, the filler metal, the weld processing, and the skill of the welder, the final welded joint can exhibit undercutting, porosity, incomplete fusion, incomplete joint penetration, excessive melt through, weld cracking, and cracking in the heat affected zone. The composition and microstructure of the pieces being joined are locally altered from their desired conditions, and are typically weaker and more susceptible to corrosion than before joining. Consequently, the welded joint is often the site of the initiation of failure in service.

In soldering and brazing, a layer of a metal that is more noble and has a lower melting point than the pieces being joined is flowed between the pieces. Soldering and brazing are similar operations in the sense that they rely upon the adhesion of the solder or braze layer to the pieces to effect the joint. Fluxing of the surfaces of the pieces being joined aids in attaining reasonable strength in the joint. The solder and braze alloys are normally relatively weak compared to the structural alloys of the pieces being joined, and are quite often more brittle than the structural alloys. A sufficiently high strength for most structural applications is achieved only when the joint is very thin, on the order of a few thousandths of an inch, resulting in a triaxial stress state in the joint. Soldered and brazed joints can suffer many of the problems of welded joints, such as porosity, incomplete bonding, microstructural changes, and dependence upon operator skill. As with welded joints, structural failure often occurs at the soldered or brazed joints.

There is a need for an improved approach to the joining of metals using an intermediate joining layer. The technique would desirably avoid the problems discussed for other techniques of this type. The present invention fulfills this need, and further provides related advantages.

SUMMARY OF THE INVENTION

The present invention provides a technique for joining metallic pieces together and the resulting structures. The approach of the invention is widely applicable to many types of base metal compositions of the pieces being joined. The joining can be accomplished rapidly by melting the intermediate joining element, or more slowly in the solid state. The pieces being joined are not melted, even locally, during the joining process. There is no limitation on the thickness of the joint. The strength of the joint follows from the diffusional incorporation of metallic atoms from the surfaces of the pieces being joined into the liquid or undercooled liquid metal joining element. The joint is therefore typically stronger than the pieces being joined, so that tests of joined pieces usually result in failure in the pieces being joined at locations remote from the joint, rather than at the joint itself. The approach of the invention has almost no dependence upon operator skill, nor does it require that the faying surfaces of the articles being joined have a particular surface finish. It is therefore highly reproducible and well suited for large-scale commercial operations.

In accordance with the invention, there are furnished a first piece to be joined having a first piece composition and a second piece to be joined having a second piece composition. A joining processing sequence is selected, including a joining temperature, joining time, joining pressure, and cooling rate. In conjunction with this selection, a metallic joining element is selected and furnished. The metallic joining element has an initial amorphous composition within a joinability compositional range and is preferably formed of at least three elements. The joinability compositional range is characterized by the retention of the amorphous state after the joining processing sequence is performed with the metallic joining element in contact with the first piece and the second piece. The method further includes placing the joining element between the first piece and the second piece, and processing the region of the joining element and the adjacent portions of the first piece and the second piece with the joining processing sequence.

In one embodiment, the joining element is selected to have an initial composition that is retained in the amorphous state after the joining processing sequence is complete. There is also an associated composition of the joining element that is related to the initial composition as the result of the surface-contact diffusion into the initial composition of further alloying elements from either the first piece or the second piece during the joining processing sequence. The associated compositions are also retained in the amorphous state at the conclusion of the joining processing sequence.

Thus, the final joined structure includes the two pieces to be joined and the amorphous joining element between them. The joining element is fully amorphous, and the joined pieces retain their original structures. The amorphous metal aids in achieving a good bond by flowing in a viscous manner above its glass transition temperature during bonding and cooling, to fill any voids that would otherwise be present at the interface and to negate residual stresses formed due to the difference in thermal expansion coefficients of the amorphous metal and the pieces being joined. After bonding, the amorphous metal has a high strength. The interdiffusional bond between the base metals being joined and the amorphous bonding element and the strength of the bonding element result in a strong joint, regardless of the thickness of the joint. That is, the joint does not rely for its strength on a triaxial stress state as in the case of brazed joints, although such a triaxial stress state may be present for the joint of the invention if the joint is thin compared to its length and depth.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a process flow diagram for the approach of the invention;

DETAILED DESCRIPTION OF THE INVENTION

Figure 1:
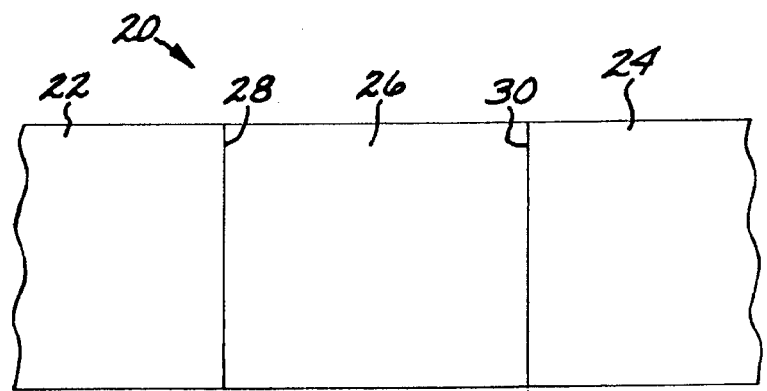
FIG. 1 is an elevational view of a bonded structure prepared according to the approach of the invention.

FIG. 1 schematically illustrates a structure 20 formed by joining together a first piece of metal 22 and a second piece of metal 24. Extending between the pieces of metal 22 and 24 and acting as a joining medium is an amorphous metallic joining element 26. The first piece of metal 22 and the joining element 26 are in contact at a first interface 28, and the second piece of metal 24 and the joining element are in contact at a second interface 30. The pieces of metal 22 and 24 are shown in a fractional view and not to scale, so that the dimensional size of the joining element 26 cannot be determined from the drawing. The joining element 26 may be of any desired thickness, ranging from less than a micrometer to an inch or more, without losing strength.

The first piece of metal 22 may be described in general terms as having an initial composition A before joining, the second piece of metal 24 may be described in general terms as having an initial composition B before joining, and the joining element may be described in general terms as having an initial composition J before joining. After the joining has occurred to produce the structure of FIG. 1, there is an intentional diffusion of some of the A material from the first piece 22 into the joining element 26, and an intentional diffusion of some of the B material from the second piece 24 into the joining element 26. As a result of the manner of the joining, there is substantially no diffusion of the J material from the joining element 26 into either the first piece 22 or the second piece 24.

Figure 2A:
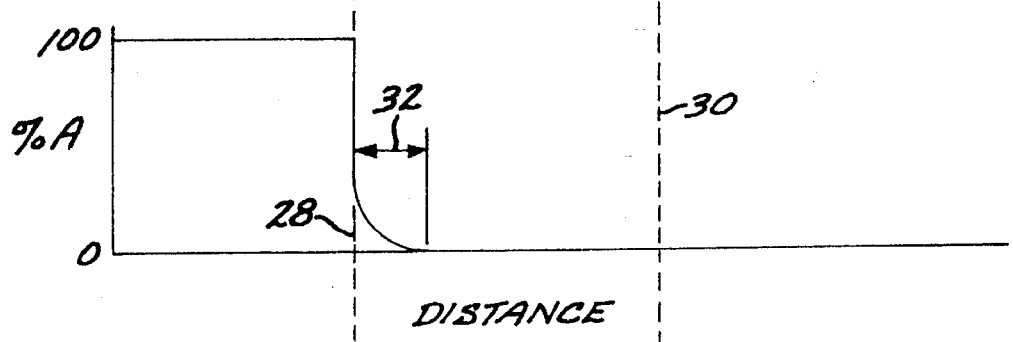
FIGS. 2(a)–(c) are schematic graphs of composition as a function of distance that are to be read in conjunction with the structure of FIG. 1, illustrating the compositional variations at and adjacent to the bonding region.
Figure 2B:
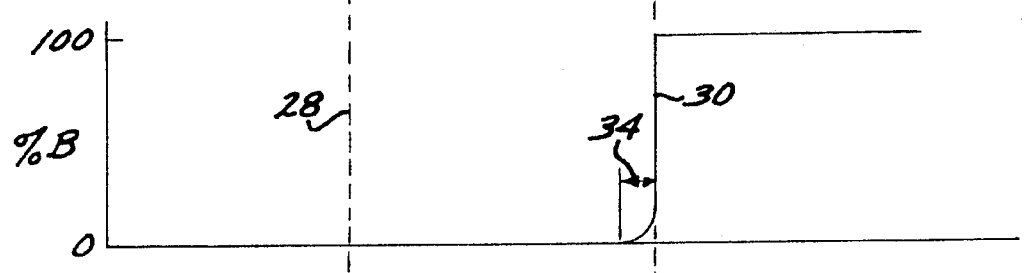
Figure 2C:
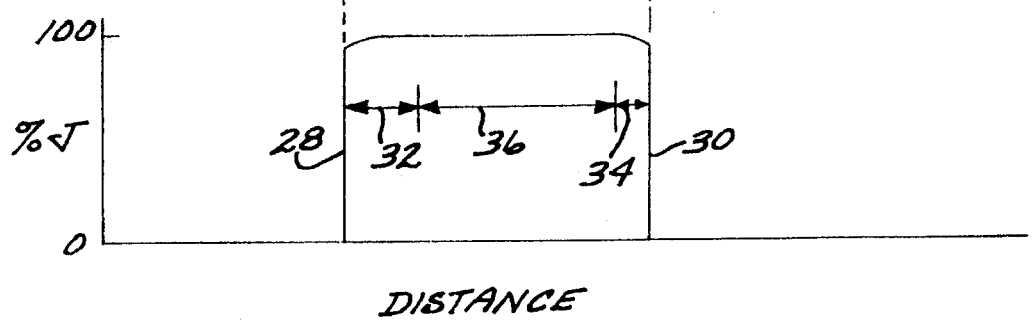

FIGS. 2(a)–(c) illustrate the composition of the structure 20 as a function of distance through the structure perpendicular to the interfaces 28 and 30. Referring to FIG. 2(a), the first piece 22 has a composition that is substantially completely A material. A small amount of the A material has diffused across the interface 28 into a first modified region 32 of the joining element 26. Referring to FIG. 2(b), the second piece 24 has a composition that is substantially completely B material. A small amount of the B material has diffused across the interface 30 into a second modified region 34 of the joining element 26. Referring to FIG. 2(c), the joining element 26 has a composition that is substantially completely J material in a central unmodified region 36. In the regions 32 and 34 of the joining element 26 adjacent to the respective interfaces 28 and 30, the joining element has a composition that is not completely J material, but instead is a mixture of J and A material in the first modified region 32 and a mixture of J and B material in the second modified region 34. The different compositions to which portions of the joining element may be modified during processing are herein collectively termed "associated compositions".

It is important that, even with the compositional change in the regions 32 and 34, the initial composition and the associated compositions of the joining element be substantially fully amorphous in the regions 32, 34, and 36. By remaining substantially amorphous throughout its complete extent, the joining element 26 maintains the ability to flow in a glassy manner during the joining operation and retains its excellent strength and corrosion-resistance properties after joining is complete. A key feature of the joining processing discussed subsequently is ensuring that the entire joining element 26 remains amorphous.

It has been previously known to use a layer of amorphous material to bond two articles together, as described in U.S. Pat. No. 4,621,031. In that case, care was taken to prevent interdiffusion of the pieces being bonded into the amorphous material, and so no attention was devoted to the problem of the effect of interdiffusion on the amorphous material. In some ways the approach of the '031 patent is similar to conventional brazing, except that temperatures above the recrystallization temperature of the amorphous material are not permitted. Although the approach of the '031 patent is operable and highly useful in many circumstances, it has now been discovered that the interdiffusion of some of the base material of each of the pieces 22 and 24 into the joining element 26 improves the strength of the bond at the respective interfaces 28 and 30. In the present approach, unlike that of the '031 patent, care must be taken to ensure that the compositional change resulting from the diffusion during joining does not prevent attaining the amorphous state in the joining element 26. The approach of the '031 patent requires a low-ductility phase and allows formation of crystalline material in the formerly amorphous zone.

U.S. Pat. No. 4,710,235 describes another use of an amorphous material to form a bond between two pieces. In this case, it was necessary that the melting point of the amorphous material be less than the recrystallization temperature of the pieces being joined. While this approach is useful for many applications, it is restrictive as to the range of amorphous materials that may be selected for use in other applications.

FIG. 3 illustrates a preferred approach for accomplishing the joining of two pieces of metal according to the present approach. The first piece 22 to be joined and the second piece 24 to be joined are provided, numerals 40 and 42. The first and second pieces are metals. The first piece and the second piece may be of the same composition and type, or, more generally, of different compositions and types. The two pieces 22 and 24 have generally conforming faying surfaces that are to be joined, shown in FIG. 1 as the interfaces 28 and 30, respectively. These surfaces need not be perfectly conformed or flat as illustrated. A virtue of the present approach is that the joining element 26 can be made thick so as to deform and accommodate irregularity in the faying surfaces. The surfaces that become the interfaces upon bonding also are not required to have any particular finish or degree of smoothness. They are desirably clean of dirt, grease, and other contaminants, because such contaminants could become trapped in the interfaces during bonding and weaken the interfaces. There is no limit to the type of metals that can be used. Examples include zirconium, hafnium, titanium, iron, nickel, copper, and cobalt. (As used herein, the naming of a metal includes its alloys wherein the named metal constitutes at least 50 percent of the alloy.)

A joining processing sequence is selected, numeral 44, and a metallic joining element is furnished, numeral 46. These steps are typically performed together and in consideration of each other, using available data or, where necessary, developing the required data. The joining processing sequence, numeral 44, includes heating to a joining temperature, application of a pressure to the region being joined (preferably perpendicular to the interfaces being joined), and cooling to ambient temperature. The heating rate has not been found to be critical except as discussed hereafter to ensure that transformation to the crystalline state is avoided. There is no limitation on the manner of heating, and furnace heating, electrical resistance heating, frictional heating, laser heating, and other types have been found operable. The heating technique is selected according to the equipment most suited for a particular type of the pieces 22 and 24.

The joining temperature can be any temperature above $T_g$, the glass transition temperature of the initial composition of the joining element 26. Although the composition of the joining element 26 changes somewhat during the course of the joining operation, the value of $T_g$ does not vary greatly with such changes in composition and remains essentially constant.

Figure 4:
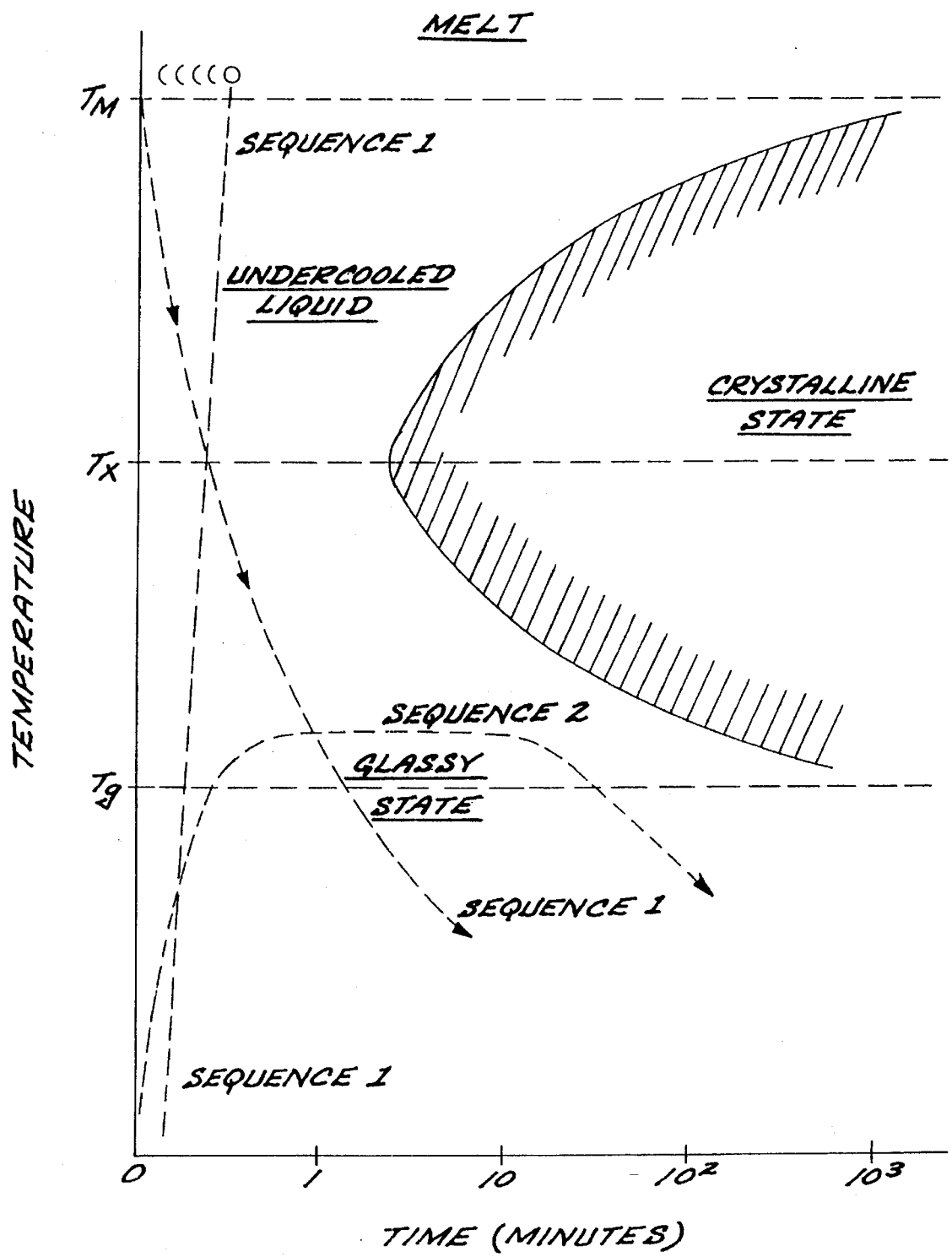
FIG. 4 is a time-temperature-transformation diagram for a joining processing sequence.

FIG. 4 depicts a diagram termed a time-temperature-transformation ("TTT") diagram that is useful in determining the joining processing sequence. The TTT diagram is widely known and used in the field of steel treating. Its principles, applied in a modified form, are also useful in summarizing the properties and depicting the processing of amorphous/crystalline materials. The diagram is modified from the conventional TTT diagram to the extent of depicting the useful concepts of amorphous (glassy) state and crystalline state, rather than the various phases of the steel.

Preferably, the TTT diagram such as that of FIG. 4 for the composition of the joining element of interest will be available for use in planning the joining processing sequence. If a TTT diagram of this type is not available for the composition of the particular joining element of interest, it can be readily prepared by generally the same types of routine procedures used to determine TTT diagrams for steels. Summarizing the procedure briefly, specimens of the composition are heated to a temperature, held at that temperature for various times, quenched, and analyzed. The analysis to determine whether the structure is amorphous or crystalline is most readily performed by X-ray diffraction, as the diffraction patterns for the two states differ significantly. This approach for distinguishing the two states is well known in the art. The procedure is repeated at various temperatures to develop the diagram shown in FIG. 4. The crystallization temperature $T_x$ is defined as the temperature corresponding to the nose (leftmost extending point) of the crystalline phase field.

$T_g$ is determined by an endothermic rise in the temperature trace of a differential scanning calorimeter. The value of $T_g$ is here defined, as is the usual case, as the temperature at which the viscosity of the amorphous (glassy) material is approximately $10^{13}$ poise. A "melting temperature" $T_m$ is shown for reference as the temperature at which the viscosity of the material falls below $10^2$ poise. It will be appreciated that an amorphous material does not experience a melting phenomenon in the same manner as a crystalline material. Nevertheless, it is convenient to have a $T_m$ reference to describe a temperature at which the viscosity of the material is so low that, to the observer, it behaves as a melted solid. The precise values and field boundaries of the TTT diagram vary with composition. However, that variation is typically sufficiently low that the TTT diagram for the initial composition of the joining element can be used for the associated compositions as well. In the processing procedures of most interest here, as in steel processing technology, the joining processing sequence does not so closely approach the particular limiting values and field boundaries that minor variations become significant.

An important property depicted by the TTT diagram of FIG. 4 is that there is a temperature and time-dependent transition from the amorphous state to the crystalline state. An objective of the joining processing sequence is to maintain the joining element in the amorphous state, so the joining processing sequence cannot permit the joining element to cross into the "crystalline state" field. The joining processing sequence should also provide that the processing be performed above $T_g$.

The joining element 26 and at least the immediately adjacent portions of the pieces 22 and 24 are heated to a processing temperature within the amorphous field. A joining pressure is applied to cause the joining element to viscously deform to conform to the interfaces 28 and 30. If the interfaces 28 and 30 are smooth, the joining element 26 may be thin and need not deform greatly to conform to the interfaces. If the interfaces 28 are rough or featured, a thicker joining element is used and more deformation is required to achieve conformance. The joining pressure is determined in conjunction with the viscosity of the joining element at the selected temperature, and is higher for lower processing temperatures. The joining pressure is typically from about 10 to about 100 atmospheres.

After a period of time (whose selection is discussed subsequently), the joining element 26 is cooled to a temperature below $T_g$ and thence to ambient temperature. The cooling rate must be sufficiently high that the joining element does not enter the crystalline field of the TTT diagram. Thus, the longer the time at the joining temperature, the faster must be the cooling to avoid entering the crystalline field.

By way of illustration of these principles, FIG. 4 depicts two possible types of joining processing sequences, sequence 1 and sequence 2. In the processing sequence depicted in sequence 1, the joining element and at least the adjacent portions (or, in some cases, all) of the pieces 22 and 24 are heated to a temperature above $T_m$. A pressure of about 150 pounds per square inch (psi) is applied at that temperature. Inasmuch as there is substantially no tendency to transform to the crystalline state at this temperature, the joining element may be held at that temperature for an indefinitely long period until full contact along the interfaces is achieved. For the purposes of determining the required cooling rate, sequence 1 is translated back to the origin because the time at temperature is not a relevant consideration for the required cooling rate in this case. The cooling rate must be sufficiently high that the cooling portion of sequence 1 does not enter the crystalline field. In practice, this means that sequence 1 must miss the nose of the crystalline field. The selected cooling rate will usually be chosen to be the slowest cooling rate so that the center of the joining element passes by the nose, within the minimum clearance permitted by experimental or commercial tolerances. In common with quenching and cooling practice generally, overly high cooling rates can lead to high internal stresses within the pieces 22 or 24. It may therefore be preferred in some cases to use the approach of sequence 2.

Sequence 2 depicts a joining processing sequence conducted entirely below $T_x$. The joining element 26 and at least the adjacent portions of the pieces 22 and 24 are heated to a temperature above $T_g$ but below $T_x$, the region where the crystalline phase field is receding downwardly and to the right. The joining pressure is applied at this temperature. The joining pressure is typically higher than for sequence 1, because the viscosity of the amorphous material is higher at reduced temperature. At such a temperature, the time to transform to the crystalline state runs during the processing, so that sequence 2 is not translated back to the origin at the commencement of cooling as was the case for sequence 1. Heating to the processing temperature is therefore normally performed reasonably rapidly, to permit as much time as possible for joining and cooling. As for the processing sequence of sequence 1, the cooling must be started and must be sufficiently rapid to miss the crystalline state field. In following the approach exemplified by sequence 2, the crystallization temperature $T_x$ must exceed the glass transition temperature $T_g$ by an amount sufficient to permit the processing to be conducted in the interval between the two temperatures. It has been determined that, for conventional commercial practice, $(T_x-T_g)$ should be at least about 30° C.

The approach of sequence 1 achieves joining in a short time and with a low joining pressure, but requires relatively rapid cooling and therefore leads to a greater susceptibility to internal stresses within the final structure. The approach of sequence 2 requires a higher joining pressure but is less susceptible to a buildup of internal stresses. Since the approach of sequence 2 uses a lower temperature, it would be more suitable where one or both of the pieces 22 and 24 are previously heat treated to a particularly desirable structure or are themselves susceptible to thermal degradation. The selected approach will depend upon the geometries, structural heat sensitivity, and susceptibility to internal stresses (which could lead to bending or possible cracking) of the pieces 22 and 24.

The selected joining processing sequence also depends upon the position and shape of the crystalline state field. FIG. 4 shows the nose of the crystalline state field at a time in the range of 1–10 minutes, which is typical for the preferred compositions of the joining elements to be discussed subsequently. Further innovations may be successful in moving the nose to longer times, permitting more flexibility in selecting processing sequences. If the nose can be moved sufficiently far to the right, joining processing sequences with processing temperatures between $T_x$ and $T_m$, combined with a processing time and cooling rate to miss the nose of the crystalline field, may be practical in many situations.

Figure 5:
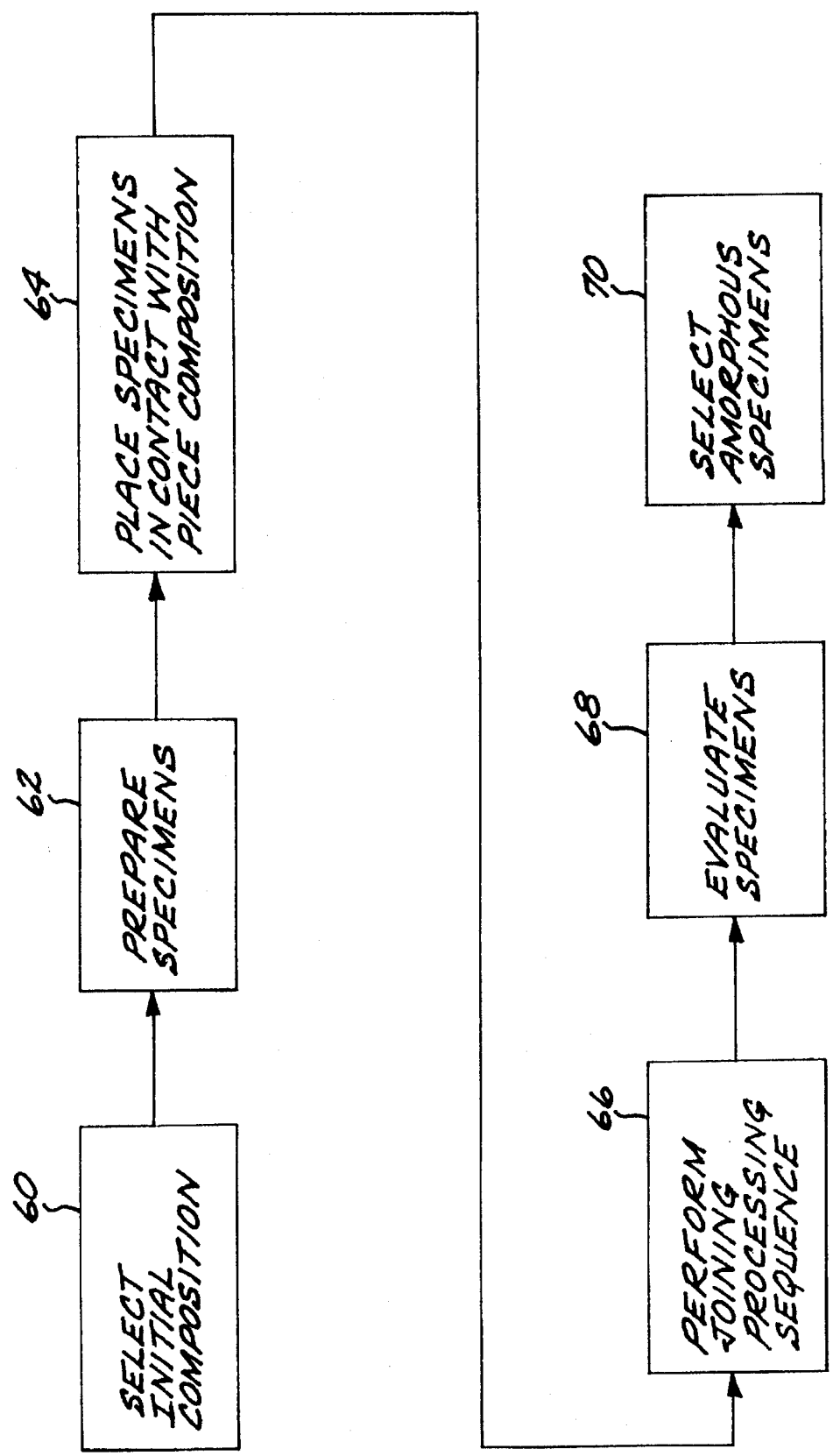
FIG. 5 is a process flow diagram for the initial selection of a metallic joining element.

The joining processing sequence is determined in conjunction with the selection of the composition of the joining element 26, numeral 46. The initial composition of the joining element 26 must be such that, after portions adjacent to the pieces 22 and 24 are modified to the associated compositions, the entire joining element 26 may be processed in the amorphous state. This type of information regarding the stability to compositional variations is desirably available for candidate materials for the joining element 26. If not, the information must be determined. FIG. 5 depicts a procedure for obtaining this information, and FIG. 6 presents a summary-form diagram that has proved useful in the analysis.

A candidate initial composition is selected, numeral 60. The selection is based in part upon the materials used in the pieces 22 and 24. The initial composition must of course be capable of retaining an amorphous structure after cooling at a sufficiently high rate that is suitable for the proposed processing. It is preferred that the initial composition comprise at least three intentionally provided elements, as such compositions are found to be the most suitable for partial modification to the associated composition without loss of the ability to reach the amorphous state. The candidate composition is one that is known to be chemically and physically compatible with the pieces 22 and 24. Most preferably, the candidate initial composition also includes some of the principal element(s) found in the first piece 22 and the second piece 24. As an example, if the first piece is a titanium-base alloy and the second piece is a zirconium-base alloy, the preferred candidate initial composition either contains both titanium and zirconium, or is known to be tolerant of the presence of titanium and zirconium while retaining the amorphous state after processing. By this selection approach, there is a degree of certainty that there will be tolerated at least some additional material diffused into the joining element.

A number of specimens of the candidate initial composition of the joining element are prepared, numeral 62. The specimens are placed into contact with pieces of the materials to be used in the first piece 22 and the second piece 24, forming a series of couples or triples, numeral 64. To continue the example, a number of triplets would be prepared with the candidate initial composition sandwiched between titanium and zirconium pieces. The samples are then processed according to the candidate joining processing sequence, numeral 66, and evaluated to determine whether the joining element remained entirely amorphous, numeral 68. Those specimens which are entirely amorphous are concluded to be within a joinability composition range.

Figure 6:
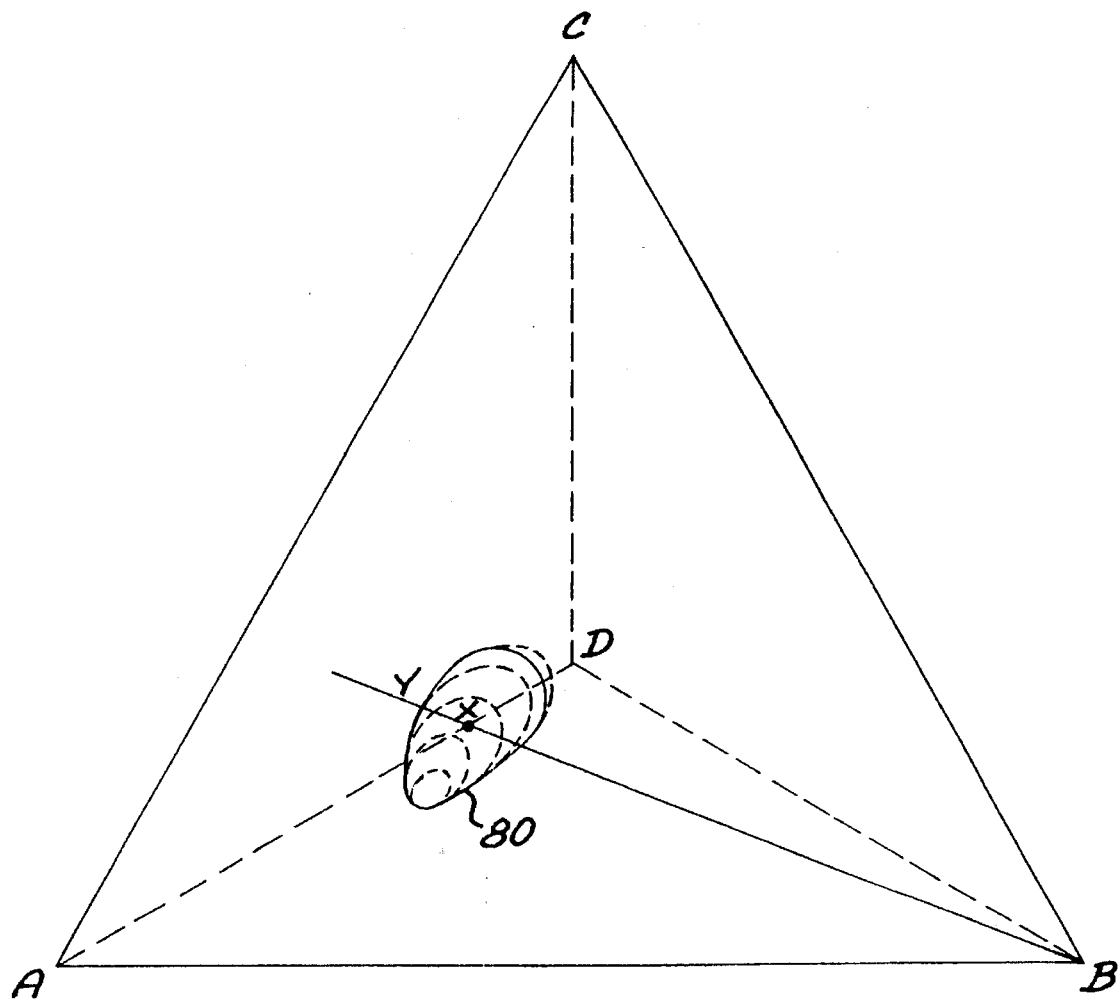
FIG. 6 is a quaternary phase diagram illustrating a joinability compositional range.

FIG. 6 illustrates a tetrahedral-plot approach for depicting the joinability composition range for a four component alloy system (A,B,C,D) wherein the alloy system includes the element B that is the principal component of one of the pieces 22 or 24. The alloy system (A,B,C,D) is known to be capable of achieving the amorphous state in at least some circumstances. A candidate initial composition for the joining element is selected and indicated on the plot of FIG. 6, here as point Y. Diffusion couples between alloys Y and B, prepared and analyzed according to the approach described above or by preparing and analyzing specimens of specific compositions, are plotted as to whether they are amorphous or crystalline. A surface drawn to divide the amorphous and crystalline regions is the joinability composition range 80.

The composition Y must be suitable for processing in contact with the piece of composition B, as just discussed, and also with the other piece. If the other piece is of the same composition B, no e valuation is required. If, on the other hand, the other piece has another composition such as composition A, the stability of candidate composition Y as against A must also be determined. While seemingly complex, this evaluation process is straightforward in practice and well within the skill of those in the art when guided by the approach described above.

Once the material of the joining element 26 has been determined, the required size of joining element to fit at the interfaces 28 and 30 is furnished. There are two different approaches to furnishing this joining element. In one, a separate, free-standing joining element is prepared. In the other, the composition of the joining element is deposited as a coating, such as by electroplating, sputtering, electron beam evaporation, or other technique, directly onto one of the pieces 22 or 24. The joining element may be of any suitable thickness because the operability of the joining element is not dependent upon attaining any particular thickness as in the case of brazing.

The joining element 26 is placed between the first piece 22 and the second piece 24, numeral 48. In the first approach for preparing the joining element, the two pieces 22 and 24 are sandwiched around the joining element 26. In the second approach, the piece with the joining element deposited thereon is placed into contact with the other piece along the laying surface.

The joining processing sequence is performed, numeral 50. The selection of the joining processing sequence was described previously.

In the presently most preferred case, alloys in the five-component (Zr,Ti,Cu,Ni,Be) system are used as the basis for the joining element. In any particular case, the amount of one of these elements could approach zero. (These alloys can be depicted on a four-component diagram such as that in FIG. 6, because the Cu and Ni can be combined together due to their similar solubility properties. However, FIG. 6 is used only as a convenience in depicting relations and is not a requirement for the operability of the invention.) Compositions within this system are known to be generally capable of achieving the amorphous state during processing. See U.S. Pat. No. 5,288,344, whose disclosure is incorporated by reference. Other alloy systems that can be operable for use in the present invention are known in the art for other applications. See, for example, U.S. Pat. Nos. 5,074,935; 5,053,084; and 5,053,085, whose disclosures are incorporated by reference.

The present inventors have a particular interest in joining zirconium-base, iron-base, nickel-base, copper-base, and titanium-base pieces, and have therefore; focused their studies on the (Zr,Ti,Cu,Ni,Be) system of the '344 patent. Within this system, a preferred joining element has an amorphous structure and a composition, in weight percent, comprising from about 10 to about 38 atomic percent total of copper, nickel, cobalt, and iron; from about 45 to about 67 atomic percent zirconium; and from about 10 to about 35 atomic percent beryllium, plus incidental impurities, the total of the percentages being 100 atomic percent. Compositions within this range are found to have excellent amorphous retention properties in contact with a range of types of pieces 22 and 24 of the compositions indicated, and with a range of processing conditions. Others with an interest in joining other types of pieces 22 and 24 will have a greater interest in other systems.

The following examples illustrate aspects of the invention, but should not be taken as limiting of the invention in any respect.

EXAMPLE 1

Two ⅛ inch diameter rods of commercially pure titanium were ground flat on faying surfaces, to act as the pieces being joined. A 25 micrometer thick sheet of a joining element was prepared with a composition in weight percent of 8.7 percent nickel, 7.1 percent copper, 3.0 percent beryllium, balance zirconium, and placed between the laying surfaces of the titanium rods. The rods were forced together with 10 pounds of force. The rods were used as electrodes for capacitor discharge resistance heating. To accomplish the heating, pulses of 20, 40, and 80 Joules, followed by 8 pulses of 100 Joules, were discharged through the rods. After the discharge heating, the joining element and the adjacent regions of the pieces rapidly cooled by heat flow to the bulk. After joining was complete, the rods were loaded in simple tension. Failure occurred at a load of 57 pounds, and failure occurred in one of the titanium rods at a location remote from the joint. Thus, the joint was itself stronger than the rods.

EXAMPLE 2

Two ⅛ inch diameter rods of pure copper were turned to form 1/16 inch diameter flats at the tips. A thin foil of the same alloy used in Example 1 was placed between the tips, and the rods were loaded with a compressive force of 10 pounds. Heating was by the capacitor discharge technique of Example 1, using 5 pulses of 80 Joules each. After cooling, the rods were loaded in simple tension. Failure occurred at a load of 7.8 pounds force, and failure was in one of the copper rods at a location remote from the joint.

EXAMPLE 3

Two ¾ inch diameter rods of AISI 1018 steel cold rolled bar were obtained, and flats were machined on the ends of each rod. A thin foil of an alloy having a composition in weight percent of 8.7 percent nickel, 7.5 percent copper, 3.0 percent beryllium, balance zirconium was spot welded onto the flat surface of one of the rods, and the other rod was placed into contact with the other side of the joining element. The rods and the joining element were heated by inertial friction welding at a $Wk^2$ of 1.445. The flywheel turned at 7410 revolutions per minute (RPM) and the axial load was 5844 pounds force, so that the energy imparted was 13,790 foot-pounds. Significantly, the metal loss in welding was 0.003 inches, which is considerably less than in conventional inertial friction welding of carbon steel. A tensile bar was cut from the welded pieces and tested in tension. Failure occurred at a stress of 34,000 psi near the weld.

EXAMPLE 4

A 10 gram sample of chemically pure zirconium was contacted with a similar amount of a joining element alloy having a composition in weight percent of 62.6 percent zirconium, 13.2 percent copper, 11.0 percent titanium, 9.8 percent nickel, 3.4 percent beryllium, which was a liquid at 900° C., and cooled in a water-cooled hearth. The amorphous joining alloy wet the zirconium well as determined by viewing at high magnification in a transmission electron microscope. There was a continuously bonded region at the interface. The joining alloy remained entirely amorphous after cooling, forming an atomically sharp interface with the zirconium. The joined sample was bent until failure occurred. The failure was due to separation in the zirconium.

EXAMPLE 5

Example 5 was repeated, except that chemically pure titanium was used in place of zirconium. The same results were obtained, and failure occurred due to separation in the titanium.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for joining two pieces of metal together, comprising the steps of:

furnishing a first piece to be joined, the first piece having a first piece composition;

furnishing a second piece to be joined, the second piece having a second piece composition;

selecting a joining processing sequence including a joining temperature, joining time, joining pressure, and cooling rate;

furnishing a joining element made of a metal having an initial composition and an associated composition that are retained in an amorphous metallic state during the joining processing sequence, the associated composition being related to the initial composition by being the result of surface-contact diffusion into the initial composition of further alloying elements from the group consisting of the first piece composition and the second piece composition during the joining processing sequence;

placing the joining element between the first piece and the second piece; and processing the region of the joining element and the adjacent portions of the first piece and the second piece with the joining processing sequence, the step of processing including the steps of processing being conducted such that alloying elements from the first piece and the second piece interdiffuse into the joining element, and including a step of cooling the joining element and the adjacent portions of the first piece and the second piece at a rate sufficiently great that the joining element initial composition and the joining element associated composition retain an amorphous metallic state after cooling is complete.

2. The method of claim 1, wherein the step of furnishing a joining element includes the step of preparing a piece of the joining element separate from both the first piece and the second piece.

3. The method of claim 1, wherein the step of furnishing a joining element includes the step of depositing a layer of the joining element material on one of the first piece and the second piece.

4. The method of claim 1, wherein the step of processing includes the step of heating the joining element to a temperature below its melting point.

5. The method of claim 4, wherein the step of furnishing a joining element includes the step of furnishing a joining element having an initial composition crystallization temperature and an initial composition glass transition temperature, and wherein the initial composition crystallization temperature exceeds the initial composition glass transition temperature by at least about 30° C.

6. A method for joining two pieces of metal together, comprising the steps of:

furnishing a first piece to be joined, the first piece having a first piece composition;

furnishing a second piece to be joined, the second piece having a second piece composition;

selecting a joining processing sequence including a joining temperature, joining time, joining pressure, and cooling rate;

furnishing a joining element made of a metal having an initial composition and an associated composition that are retained in an amorphous metallic state during the joining processing sequence, the associated composition being related to the initial composition by being the result of surface-contact diffusion into the initial composition of further alloying elements from the group consisting of the first piece composition and the second piece composition during the joining processing sequence;

placing the joining element between the first piece and the second piece; and processing the region of the joining element and the adjacent portions of the first piece and the second piece with the joining processing sequence, the step of processing including the steps of heating the joining element to a temperature at which the viscosity of the joining element falls below $10^2$ poise, and cooling the joining element and the adjacent portions of the first piece and the second piece at a rate sufficiently great that the joining element initial composition and the joining element associated composition retain an amorphous metallic state after cooling is complete.

7. The method of claim 6, wherein the step of furnishing a joining element includes the step of preparing a piece of the joining element separate from both the first piece and the second piece.

8. The method of claim 6, wherein the step of furnishing a joining element includes the step of depositing a layer of the joining element material on one of the first piece and the second piece.

9. The method of claim 6, wherein the step of furnishing a joining element includes the step of furnishing a joining element having a composition, in weight percent, comprising from about 10 to about 38 atomic percent total of copper, nickel, cobalt, and iron, from about 45 to about 67 atomic percent zirconium, and from about 10 to about 35 atomic percent beryllium, plus incidental impurities, the total of the percentages being 100 atomic percent.

10. A method for joining two pieces of metal together, comprising the steps of:

furnishing a first piece to be joined, the first piece having a first piece composition;

furnishing a second piece to be joined, the second piece having a second piece composition;

selecting a joining processing sequence including a joining temperature, joining time, joining pressure, and cooling rate;

furnishing a metallic joining element having an initial composition within a joinability compositional range, the joinability compositional range being characterized by the attainment of the amorphous state in the metallic joining element after the joining processing sequence is performed with the metallic joining element in contact with the first piece and the second piece;

placing the joining element between the first piece and the second piece; and processing the region of the joining element and the adjacent portions of the first piece and the second piece with joining processing sequence, the step of processing being conducted such that alloying elements from the first piece and the second piece interdiffuse into the joining element.

11. The method of claim 10, wherein the step of furnishing a metallic joining element includes the steps of:

selecting a base alloy composition of a material that exhibits an amorphous structure after cooling from an elevated temperature at a sufficiently high rate, preparing a plurality of specimens of alloys of different compositions that are combinations of the base alloy composition and a selected one of the first piece composition and the second piece composition, placing each of the specimens of alloys in contact with a piece of the selected one of the first piece composition and the second piece composition to form a plurality of reaction couples, performing the joining processing sequence on the reaction couples, evaluating the specimens to determine whether the specimens are amorphous following the joining processing sequence, those specimens that are amorphous following the joining processing sequence being within the joinability compositional range, and selecting a specimen within the joinability compositional range as said metallic joining element.

12. The method of claim 10, wherein the step of furnishing a joining element includes the step of preparing a piece of the joining element separate from both the first piece and the second piece.

13. The method of claim 10, wherein the step of furnishing a joining element includes the step of depositing a layer of the joining element material one one of the first piece and the second piece.

14. The method of claim 10, wherein the step of processing includes the step of heating the joining element to a temperature below its melting point.

15. The method of claim 14, wherein the step of furnishing a metallic joining element includes the step of furnishing a joining element having an initial composition characterized by an initial composition crystallization temperature and an initial composition glass transition temperature, and wherein the initial composition crystallization temperature exceeds the initial composition glass transition temperature by at least about 90° C.

16. The method of claim 10, wherein the step of furnishing a metallic joining element includes the step of furnishing a metallic joining element intentionally comprising at least three elements.

17. A method for joining two pieces of metal together, comprising the steps of:

furnishing a first piece to be joined, the first piece having a first piece composition;

furnishing a second piece to be joined, the second piece having a second piece composition;

selecting a joining processing sequence including a joining temperature, joining time, joining pressure, and cooling rate;

furnishing a metallic joining element having an initial composition within a joinability compositional range, the joinability compositional range being characterized by the attainment of the amorphous state in the metallic joining element after the joining processing sequence is performed with the metallic joining element in contact with the piece and the second piece;

placing the joining element between the first piece and the second piece; and processing the region of the joining element and the adjacent portions of the first piece and the second piece with the joining processing sequence, wherein the step of processing includes the step of heating the joining element to a temperature at which the viscosity of the joining element falls below $10^2$ poise.

18. The method of claim 17, wherein the step of furnishing a joining element includes the step of preparing a piece of the joining element separate from both the first piece and the second piece.

19. The method of claim 17, wherein the step of furnishing a joining element includes the step of depositing a layer of the joining element material on one of the first piece and the second piece.

20. The method of claim 17, wherein the step of furnishing a joining element includes the step of furnishing a joining element having a composition, in weight percent, comprising from about 10 to about 38 atomic percent total of copper, nickel, cobalt, and iron, from about 45 to about 67 atomic percent zirconium, and from about 10 to about 35 atomic percent beryllium, plus incidental impurities, the total of the percentages being 100 atomic percent.

21. A method for joining two pieces of metal together, comprising the steps of:

furnishing a first piece to be joined, the first piece having a composition with at least 50 percent by weight of an element selected from the group consisting of titanium, zirconium, iron, nickel, and copper;

furnishing a second piece to be joined, the second piece having a composition with at least 50 percent by weight of an element selected from the group consisting of titanium, zirconium, iron, nickel, and copper;

furnishing a metallic joining element having a composition, in weight percent, comprising from about 10 to about 38 atomic percent total of copper, nickel, cobalt, and iron, from about 45 to about 67 atomic percent zirconium, and from about 10 to about 35 atomic percent beryllium; plus incidental impurities, the total of the percentages being 100 atomic percent, the joining element further having an amorphous structure;

placing the joining element between the first piece and the second piece;

forcing the first piece and the second piece together at a temperature and for a time sufficient to join the first piece, the joining element, and the second piece together, the step of forcing being conducted such that alloying elements from the first piece and the second piece interdiffuse into the joining element; and cooling the joining element to ambient temperature at a rate sufficient to avoid crystallization of the joining element.

* * * * *